US011148576B2

(12) United States Patent
Ivan

(10) Patent No.: US 11,148,576 B2
(45) Date of Patent: Oct. 19, 2021

(54) SYSTEM FOR THE RETENTION AND IMMOBILIZATION OF STACKED INTERMODAL CHASSIS

(71) Applicant: John A Ivan, Philadelphia, PA (US)

(72) Inventor: John A Ivan, Philadelphia, PA (US)

( * ) Notice: Subject to any disclaimer, the term of this patent is extended or adjusted under 35 U.S.C. 154(b) by 210 days.

(21) Appl. No.: 16/674,081

(22) Filed: Nov. 5, 2019

(65) Prior Publication Data

US 2021/0129733 A1    May 6, 2021

(51) Int. Cl.
*B60P 7/08* (2006.01)
(52) U.S. Cl.
CPC ..................... *B60P 7/08* (2013.01)
(58) Field of Classification Search
CPC .... B60P 7/08; B60P 3/073; B60P 3/07; B61D 3/182; B61D 3/184; B61D 45/004; B61D 45/005
USPC ......... 410/56, 57, 58, 62, 65, 7, 3, 4, 46, 31
See application file for complete search history.

(56) References Cited

U.S. PATENT DOCUMENTS

| | | | | |
|---|---|---|---|---|
| 6,786,373 B2* | 9/2004 | Pierce | ..................... | B60R 11/06 414/462 |
| 7,874,773 B2* | 1/2011 | Awad | ..................... | B65D 85/68 410/32 |
| 2007/0269283 A1* | 11/2007 | Kiestoff | .................... | B60P 3/07 410/30 |
| 2010/0226730 A1* | 9/2010 | He | ..................... | B65D 90/0026 410/31 |

* cited by examiner

*Primary Examiner* — Stephen T Gordon
(74) *Attorney, Agent, or Firm* — Stuart M. Goldstein

(57) ABSTRACT

A system for securing, stabilizing, and immobilizing a stack of intermodal chassis has a plurality of elongated, vertical supports, each support having a series of vertically aligned holes. The vertical supports are designed to be aligned adjacent to a stack of intermodal chassis and positioned in spaced relation to each other. A plurality of connector members are secured to the vertical supports and to the horizontally extending frames of the intermodal chassis in order to secure, stabilize, and immobilize the stack of chassis.

7 Claims, 7 Drawing Sheets

SYSTEM FOR THE RETENTION AND IMMOBILIZATION OF STACKED INTERMODAL CHASSIS

FIELD OF THE INVENTION

This invention relates generally to the securement, stabilization, and unitization of stacked intermodal chassis.

BACKGROUND OF THE INVENTION

Wheeled trailer frames, or intermodal chassis, are used to transport large cargo shipping containers. These are large framed carriers having a plurality of wheels. When intermodal chassis are not in use, they are often transported to and from loading and unloading locations such as ports, warehouses, seaports, railyards, or other transport related sites. Since intermodal chassis are irregular in shape, transporting many of them at one time presents a problem, in that dangerous shifting of the chassis can occur on the highway. Current methods of securing stacks of intermodal chassis do not solve the problem of shifting chassis during transport. Straps, chains, or other types of binders which are now utilized will often be insufficient to prevent chassis from sliding forward or aft. There is thus a real risk of chassis coming loose on the road, causing a dangerous situation to other vehicles and to the driver of the chassis stack himself.

It is evident that the transport of stacked intermodal chassis presents stability and undue motion problems, especially when a number of the chassis are involved. Unfortunately, there is currently no system for practically, simply, and inexpensively securing stacked intermodal chassis in a safe and stable fashion, for movement from facility to facility.

SUMMARY OF THE INVENTION

It is thus the object of the present invention to provide an effective, safe, practical, and economical system for securing, stabilizing and immobilizing stacked intermodal chassis for transport.

This and other objects are accomplished by the present invention, a system for securing and immobilizing a stack of intermodal chassis. The system comprises a plurality of elongated, vertical supports, each support having a series of vertically aligned holes. The vertical supports are designed to be aligned adjacent to a stack of intermodal chassis and positioned in spaced relation to each other. A plurality of connector members are secured to the vertical supports and to the horizontally extending frames of the intermodal chassis in order to secure and immobilize the stack of chassis.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
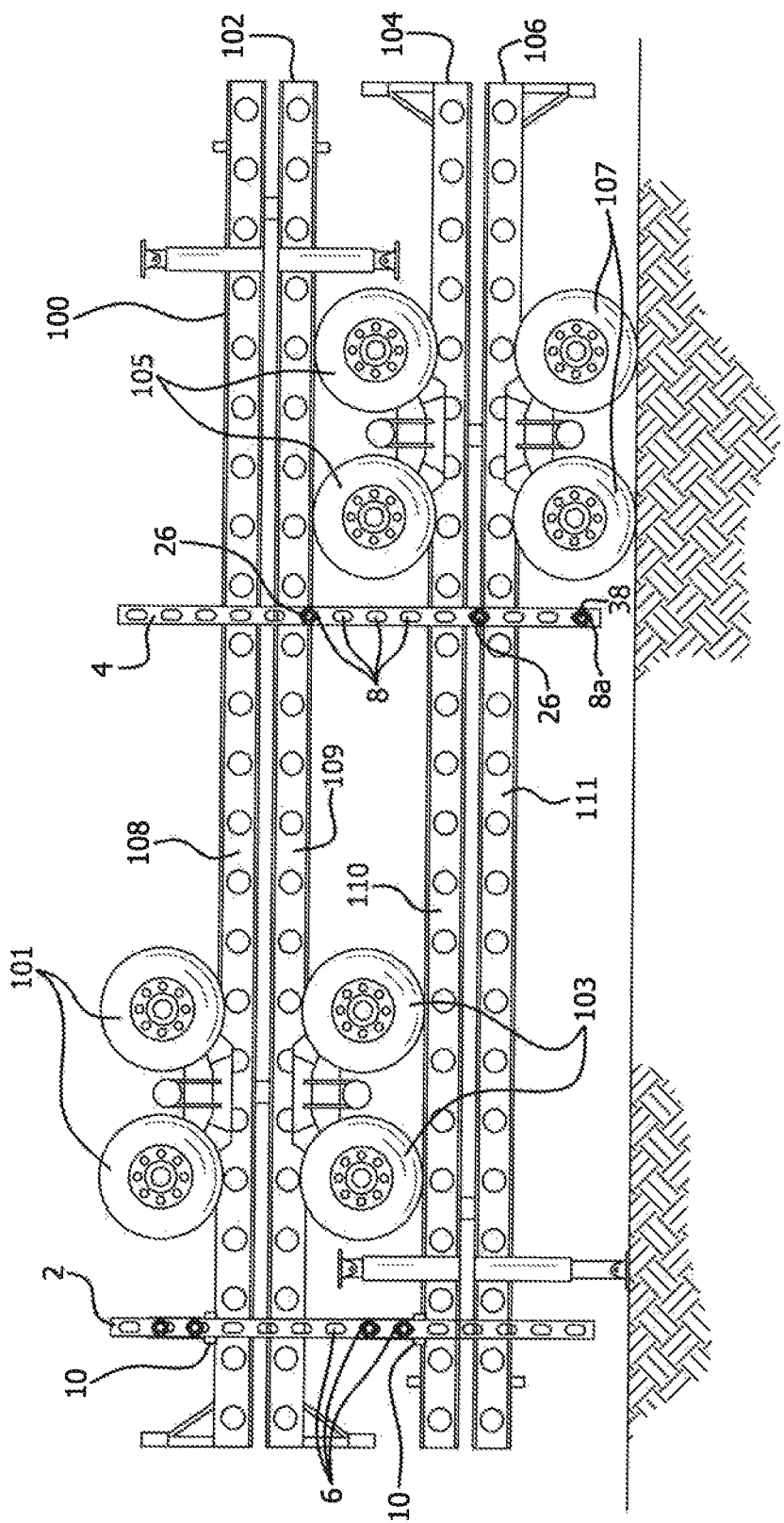
FIG. 1 is an elevation view of the present invention secured to a stack of intermodal chassis.

The system of the present invention is provided to secure and immobilize stacked intermodal chassis 100, 102, 104, and 106, each intermodal chassis having intermodals 101, 103, 105 and 107, interconnected by lateral, horizontally extending frames 108, 109, 110, and 111. The system of the present invention comprises a plurality of elongated, vertical supports 2 and 4. It is contemplated that additional vertical supports can also be utilized. Each vertical support has a series of vertically aligned through holes 6 and 8. Connector members 10, 26, and 38 are provided to conjoin vertical supports 2 and 4 to intermodal chassis 100, 102, 104, and 106. These different connector members are available to be used, depending on the configuration of the intermodal chassis and the manner in which they are to be stacked.

Figure 5:
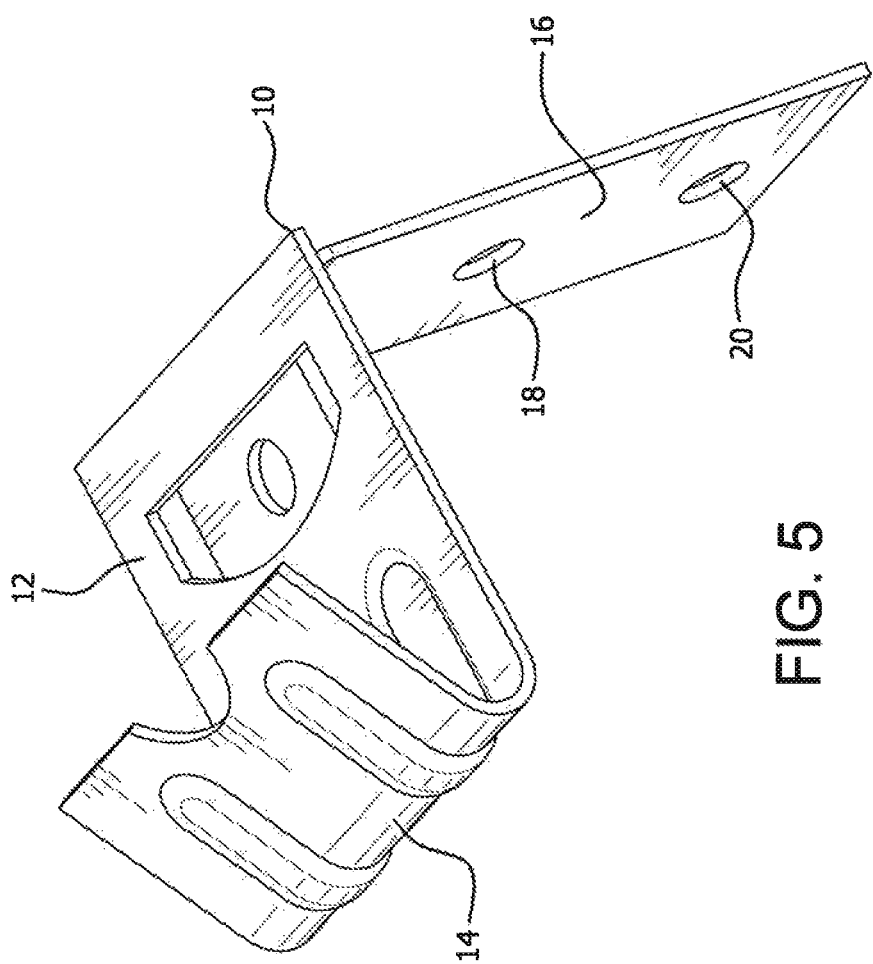
FIG. 5 is a perspective view of a connector member of the present invention.

Connector member 10, as seen in FIG. 5, comprises three sections: first section 12 which is horizontal and substantially flat, second curved, U-shaped section 14, and third section 16 having through openings 18 and 20. Third section 16 is substantially perpendicular to first section 12 and is configured to attach connector member 10 to vertical support 2 by means of threaded bolt members 22 and 24 and washer nuts 23 and 25.

Figure 6:
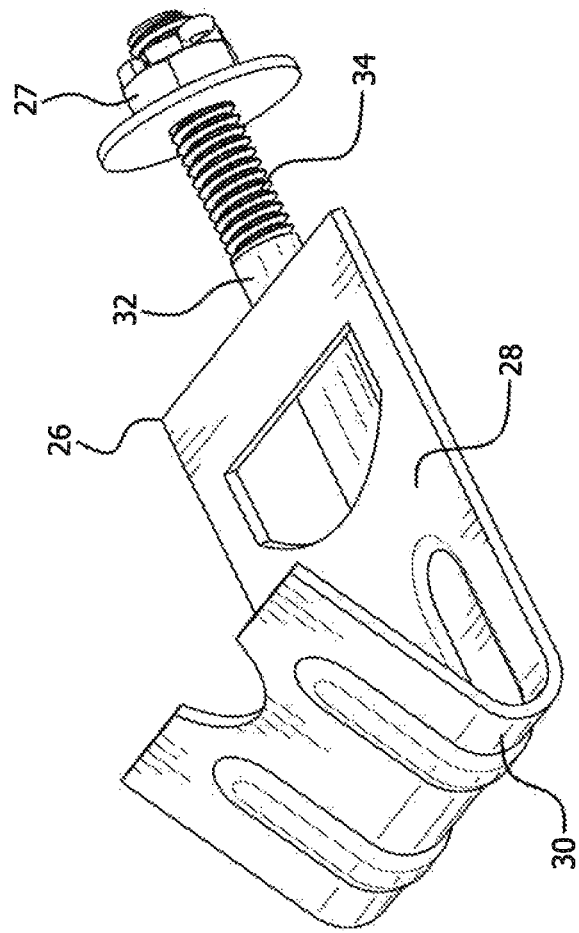
FIG. 6 is a perspective view of an alternate connector member of the present invention.

Connector member 26, as best seen in FIG. 6, comprises first horizontal, substantially flat section 28, second curved, U-shaped section 30, and cylindrical shaped third section 32 extending from first section 28. Third section 32 has threaded end 34 and is configured to attach connector member 26 to vertical support 2, using washer nut with cotter pin lock 27.

Figure 7:
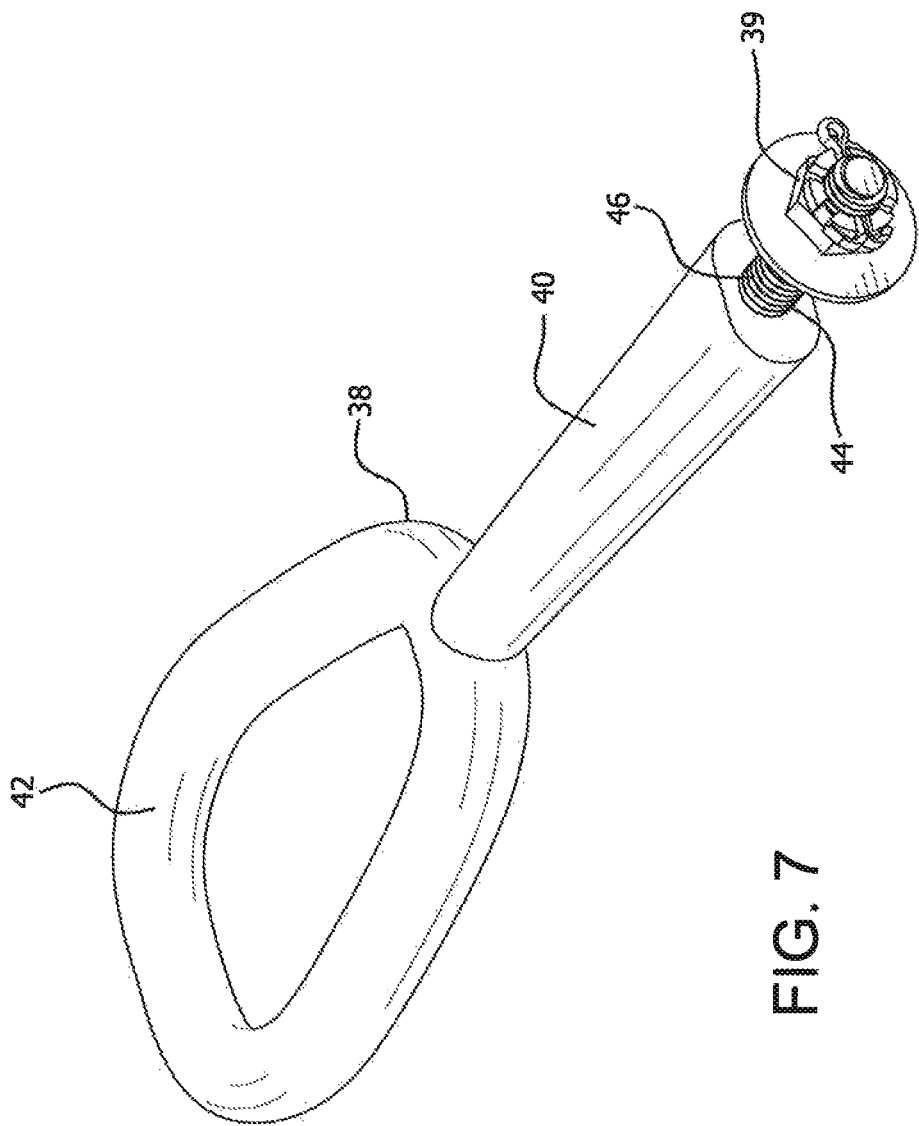
FIG. 7 is a perspective view of another embodiment of the connector member of the present invention.

Connector member 38, as best seen in FIG. 7, comprises horizontal first section 40, second section having curved loop shaped eye 42 at its distal end, and third section 44 having threads 46 which are configured to attach connector member 38 to vertical support 2, using washer nut with cotter pin lock 39.

Figure 4:
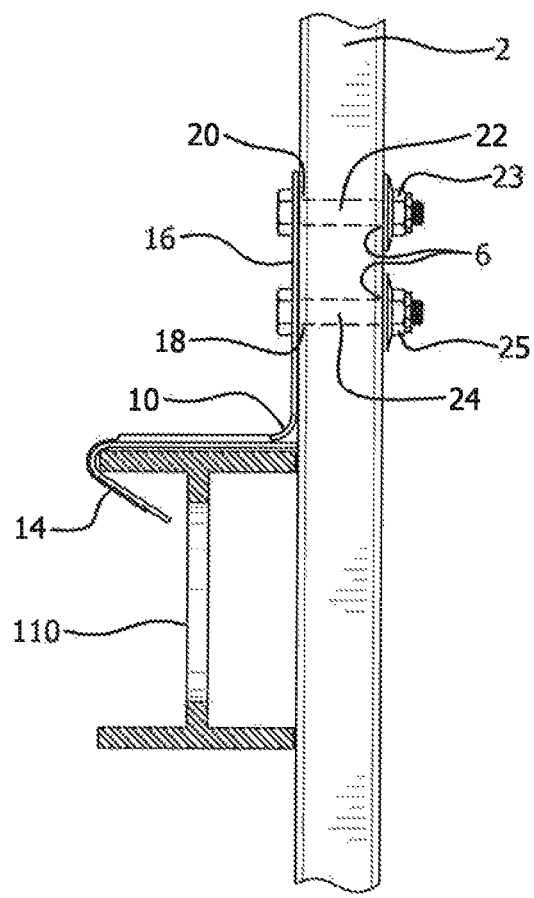
FIG. 4 is a partial elevation view of an installed component of the present invention.

In use, vertical supports 2 and 4 (and additional vertical supports if desired) are placed, upright in spaced relation to each other, next to stacked intermodal chassis 100, 102, 104, and 106, on both sides of the stacked chassis. For example, first section 12 of connector member 10 is overlaid onto frame 110 of the intermodal chassis, e.g. chassis 104 as seen in FIG. 4, with its curved section 14, extending over the frame. Connector member 10 is then positioned with its third section 16 adjacent to vertical support 2, such that through openings 18 and 20 of the third section are aligned with holes 6 of the vertical support. Bolt members 22 and 24 are inserted into through openings 18 and hole 6 and through opening 20 and hole 6, respectively. Washer nuts 23 and 25 are then screwed onto bolts 22 and 24 to rigidly secure vertical support 2 to intermodal chassis 104. This process is continued for every location in which vertical support 2 is positioned adjacent to the frames of intermodal chassis 100, 102, 104, and 106 and to each vertical support placed next to the stack of intermodal chassis.

While four stacked intermodal chassis are depicted, the system of the present invention can accommodate as little as two and as many as five stacked chassis.

Figure 2:
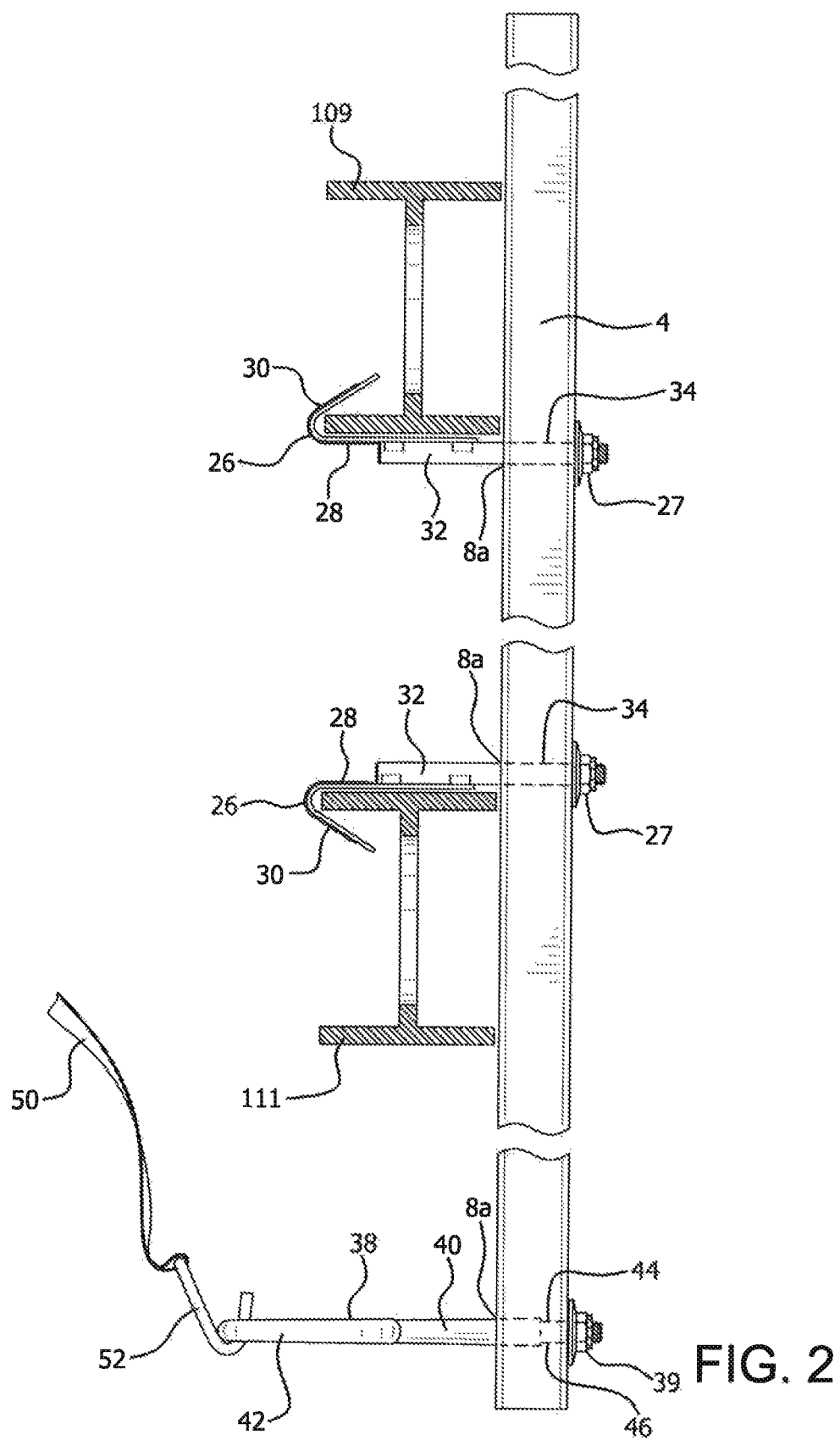
FIG. 2 is a partial elevation view of installed components of the present invention.
Figure 3:
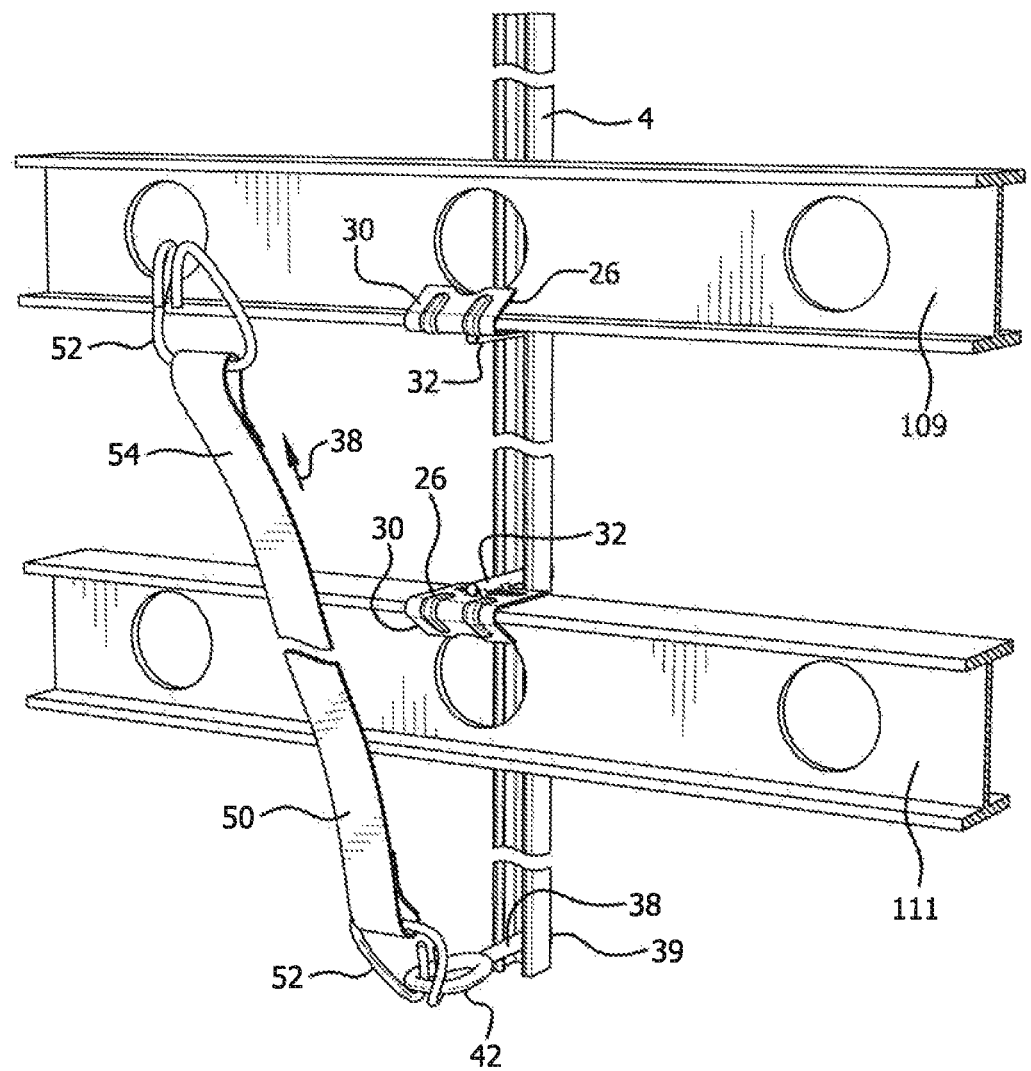
FIG. 3 is a partial front view of installed components of the present invention.

Alternate connector members are available to be used in combination with the vertical supports. For instance, as seen in FIGS. 2 and 3, first section 28 of connector member 26 is positioned under frame 109 of intermodal chassis 102, with its curved second section 30 extending over the frame. Connector member 26 is then positioned such that threaded end 34 of third section 32 extends through hole 8 of vertical support 4. Washer nut 27 is screwed onto threaded end 34 of the third section to rigidly secure vertical support 4 to intermodal chassis 102. This process is continued with the other vertical supports, as has been previously described with regard to connector member 10.

It is noted that while each of the stacked intermodal chassis must be secured via vertical supports by at least one connector member, multiple connectors can be utilized for each chassis. Connector members 10 and 26 can be used interchangeably based on the positions of the chassis' frames and the vertical supports.

Connector members 38 can also be used in combination with strap 50 to provide an additional attachment to secure the stacked intermodal chassis. As best seen in FIGS. 2 and 3, first section 40 and curved loop shaped eye second section of lower connector member 38 is positioned through the bottommost opening 8a in vertical support 4. Third section 44 is then inserted through opening 8a as well, wherein washer nut 39 is screwed onto the threaded end of the third section. Strap 50 is attached to second section 42 via its loop shaped eye by strap hook 52 and then extended up to the top opening of the opposite vertical support on the other side of the stacked intermodal chassis. There the strap is connected to second strap hook 52 which is then linked to a second connector 38 attached to the opposite vertical support.

Thus, proper utilization of the vertical supports and the various connector members of the present invention will effectively serve to secure, stabilize, and immobilize stacked intermodal chassis.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A system for securing, stabilizing, and immobilizing a stack of intermodal chassis, each chassis having lateral, horizontally extending frames which extend the length of each chassis, between opposite ends of each chassis, said system comprising:

a plurality of elongated, vertical supports, each vertical support having a series of vertically aligned holes extending the length of the vertical support, each vertical support being adjacent to and resting on sides of the frames of the chassis, and wherein the vertical supports are located between the opposite ends of and in spaced apart relation to each other along the lengths of the frames of the chassis, and a plurality of connector members, each connector member having a curved end section and a second section, the curved end sections of the connector members overlapping the frames of the chassis and the second sections of said connector members being attached to the vertical supports, wherein the connector members conjoin and affix the chassis directly to the vertical supports for securing, stabilizing and rigidly immobilizing the stack of intermodal chassis.

2. The system as in claim 1 wherein the second section of each connector member is perpendicular to a third section of the connector member.

3. The system as in claim 2 wherein the curved section of each connector member is U-shaped and the second section of each connector member has through openings.

4. The system as in claim 1 wherein the second section of each connector member comprises a threaded end.

5. The system as in claim 4 wherein the curved section of each connector member is U-shaped.

6. The system as in claim 4 wherein the curved section of each connector member has a loop shaped eye.

7. The system as in claim 6 further comprising a hook member connecting the eye to a strut of one of the vertical supports.

\* \* \* \* \*